United States Patent Office 3,275,686
Patented Sept. 27, 1966

3,275,686
PROCESS FOR THE PREPARATION OF ALKALI METAL SALTS OF ACETYLENIC ACIDS
Abraham N. Kurtz, Charleston, W. Va., assignor to Union Carbide Corporation, a corporation of New York
No Drawing. Filed May 18, 1965, Ser. No. 456,801
15 Claims. (Cl. 260—533)

This application is a continuation of application Serial No. 224,498, filed September 18, 1962, now abandoned, which, in turn, was a continuation-in-part of application Serial No. 140,270, filed September 29, 1961, and now abandoned.

This invention relates to an improved process for the carbonation of alkali metal derivatives of compounds containing a terminal acetylenic linkage. More particularly, this invention relates to the use of certain amides as promoters for said carbonation.

It is known that an alkali metal acetylide will react with carbon dioxide to form an alkali metal salt of an acetylenic acid as illustrated by the schematic equation:

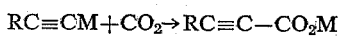

$$RC \equiv CM + CO_2 \rightarrow RC \equiv C-CO_2M$$

wherein R is a hydrogen atom or an organic hydrocarbon radical and M is an alkali metal atom. This reaction has not been commercially attractive, however, because high pressures and long reaction times are often necessary to achieve good yields of the acetylenic acid salt. For example, to obtain good yields of sodium propiolate by the carbonation of sodium acetylide it was necessary to employ pressures of about 500 to 1000 p.s.i.g., temperatures of about 25° C. to 75° C., and reaction times of about 16 hours or more.

It has now been discovered by this invention that certain amides act as promoters for the carbonation of alkali metal acetylides and permit the rapid production of alkali metal salts of acetylenic acids at lower pressures and temperatures than heretofore possible.

In general, the process of this invention comprises contacting an alkali metal acetylide, an amide as hereinafter defined, and a diluent with carbon dioxide.

By the term "alkali metal acetylide," as employed throughout this application, is meant a compound represented by the formula:

$$RC \equiv CM$$

wherein M is an alkali metal atom, such as lithium, potassium, sodium, rubidium, or cesium, and wherein R is a hydrogen atom, an alkyl radical, such as methyl, ethyl, propyl, butyl, pentyl, hexyl, 2-ethylhexyl, and the like, an alkenyl radical such as vinyl, allyl, 1-propenyl, 2-propenyl, 1-butenyl, 2-butenyl, 3-butenyl, and the like, an aryl radical, such as phenyl, naphthyl, and the like, aryl-substituted alkyl radicals, such as benzyl, alpha-methyl-benzyl, phenethyl, naphthylmethyl, and the like, and alkyl-substituted aryl radicals, such as tolyl, xylyl, mesityl, and the like. Preferred alkali metal acetaylides are those wherein R has up to 7 carbon atoms. As examples of suitable alkali metal acetylides one can mention sodium acetylide, sodium methylacetylide, sodium ethylacetylide, sodium propylacetylide, sodium vinylacetylide, sodium phenylacetylide, potassium acetylide, potassium methylacetylide, potassium propylacetylide, potassium vinylacetylide, potassium phenylacetylide, lithium acetylide, rubidium acetylide, cesium acetylide, and the like. The utilization of amides as promoters is particularly beneficial in the carbonation of sodium acetylide to form sodium propiolate.

The amides that are useful as promoters for the carbonation of alkali metal acetylides are represented by the formula:

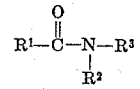

wherein $R^1$, when taken alone, can be a hydrogen atom, an alkyl radical having from 1 to about 10 carbon atoms, such as methyl, ethyl, propyl, butyl, pentyl, hexyl, octyl, decyl, benzyl, and the like, or an aryl radical having from 6 to 10 carbon atoms, such as phenyl, tolyl, xylyl, naphthyl, and the like; each $R^2$ and $R^3$, when taken alone, is an alkyl radical having from 1 to about 10 carbon atoms, or an aryl radical having from 6 to about 10 carbon atoms; and $R^1$ and $R^2$, when taken together with the amide radical

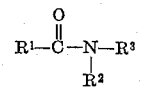

form a heterocyclic ring having from 5 to 7 ring atoms, said $R^1$ and $R^2$ forming a divalent alkylene radical having from 3 to about 10 carbon atoms, such as trimethylene, tetramethylene, pentamethylene, trimethyltrimethylene, and the like. Preferred amides are those wherein $R^1$, when taken alone, is a hydrogen atom or an alkyl radical having from 1 to about 4 carbon atoms; each $R^2$ and $R^3$, when taken alone, is an alkyl radical having from 1 to about 4 carbon atoms, said $R^2$ and $R^3$ being the same; and wherein $R^1$ and $R^2$, when taken together, form an alkylene radical having from about 3 to 5 carbon atoms. As examples of amides that are useful as promoters in the process of this invention one can mention N,N-dimethylformamide,
N,N-diethylformamide,
N,N-dipropylformamide,
N,N-dibutylformamide,
N,N-dimethylacetamide,
N,N-diethylacetamide,
N,N-dipropylacetamide,
N,N-dibutylacetamide,
N,N-dimethylpropionamide,
N,N-diethylpropionamide,
N,N-dipropylpropionamide,
N,N-dibutylpropionamide,
N,N-dimethylbutyramide,
N,N-diethylbutyramide,
N,N-dipropylbutyramide,
N,N-dibutylbutyramide,
N-methyl-N-ethylacetamide,
N-methyl-N-ethylpropionamide,
N-methyl-N-ethylbutyramide,
N-ethyl-N-propylacetamide,
N-ethyl-N-propylpropionamide,
N-ethyl-N-propylbutyramide,
N-methyl-2-pyrrolidone,
N-ethyl-2-pyrrolidone,
N-propyl-2-pyrrolidone,
N-butyl-2-pyrrolidone,
N-methyl-3-methyl-2-pyrrolidone,
N-ethyl-3-methyl-2-pyrrolidone,
N-propyl-3-methyl-2-pyrrolidone,
N-butyl-3-methyl-2-pyrrolidone,
N-methyl-4-methyl-2-pyrrolidone,
N-ethyl-4-methyl-2-pyrrolidone,
N-propyl-4-methyl-2-pyrrolidone,
N-butyl-4-methyl-2-pyrrolidone,
N-methyl-5-methyl-2-pyrrolidone,
N-ethyl-5-methyl-2-pyrrolidone,
N-propyl-5-methyl-2-pyrrolidone, N-butyl-5-methyl-2-pyrrolidone,
N-methyl-2-piperidone,
N-ethyl-2-piperidone,
N-propyl-2-piperidone,
N-butyl-2-piperidone,
N-methyl-2-oxo-hexamethylenimine,
N-ethyl-2-oxo-hexamethyleneimine,
N-propyl-2-oxo-hexamethyleneimine,
N-butyl-2-oxo-hexamethyleneimine, and the like. Particularly preferred amides for use as promoters in the process of this invention are N,N-dimethylformamide, N,N-dimethylacetamide, and N-methyl-2-pyrrolidone.

The mole ratio of the amide promoter to alkali metal acetylide in the charge can be from about 0.2:1 or less to about 10:1 or higher. The preferred molar ratio of amide promoter to alkali metal acetylide is from about 1.5:1 to about 2.5:1.

The process of this invention is conducted in a normally liquid, inert, organic diluent, as for example, aromatic hydrocarbons, such as benzene, toluene, xylene, and the like; aliphatic hydrocarbons, such as butane, pentane, heptane, hexane, octane, nonane, decane, and the like; and petroleum fractions, such as gasoline and kerosene; and mono and polyethers, such as dioxane, diethyl ether of diethylene glycol, dibutyl ether of diethylene glycol and the like, etc.

The mole ratio of diluent to alkali metal acetylide in the charge can be from about 1:1 or less to about 20:1 or more, with a mole ratio of from about 4:1 to about 7:1 preferred.

The alkali metal acetylide, amide promoter, and diluent can be added to the charge in any order. A preferred procedure comprises dispersing the alkali metal acetylide in the diluent. Carbon dioxide is then introduced to the dispersion, preferably by bubbling through the dispersion. When the carbon dioxide is in equilibrium with the dispersion, as evidenced by cessation of absorption of carbon dioxide, the amide promoter is added and the reaction is carried to completion. Good agitation of the reaction mixture should be maintained throughout the reaction to insure good yields of the alkali metal salt of the acetylenic acid.

It is an advantage of the utilization of the amides disclosed herein as promoters for the carbonation of alkali metal acetylides that the carbonation proceeds readily at low pressures, notably at about one atmosphere or less, although higher pressures can be employed if desired. As a further advantage, high temperatures are not necessary when the amides are employed as promoters for the carbonation of alkali metal acetylides, for the reaction proceeds readily at a temperature of from about —20° C. to about 30° C., with temperatures of about —10° C. to about +10° C. preferably employed. Finally, the utilization of the amides as promoters permits reaction times of 20 minutes or less.

The acid salts produced by the process of this invention are solids and therefore can be recovered from the reaction mixture by conventional solid-liquid separation procedures, such as by filtration, centrifugation, and the like, and thereafter washed with a liquid organic hydrocarbon, such as those referred to above as being useful as diluents, and then dried.

In a preferred embodiment of the process of this invention, carbon dioxide at a pressure of from about 0.85 to 1 atmosphere pressure is bubbled through a well agitated dispersion of sodium acetylide in xylene at 0° C., the mole ratio of sodium acetylide to xylene being about 1:5, until consumption of carbon dioxide ceases. Then about 2 moles of dimethyl formamide per mole of sodium acetylide charged are added to the mixture and the reaction is continued until consumption of carbon dioxide again ceases. The reaction vessel is then flushed with dry nitrogen, warmed to room temperature, and the product sodium propiolate is filtered from the reaction mixture, washed, and dried.

The following examples are illustrative:

Example I

A two-liter, leak-tight flask equipped with a stirrer with a hemispherical stirrer blade was immersed in a cooling bath and was charged with 186.5 grams of an 18 percent sodium acetylide dispersion in xylene under a pure nitrogen atmosphere. Then 412.5 milliliters of xylene and 102 grams of N,N-dimethylformamide were added to the flask with stirring. The system was cooled to —10° C. and evacuated to about 2 millimeters of mercury pressure. The temperature was then raised to 0° C. and carbon dioxide at a pressure of 649 millimeters mercury was rapidly bubbled through the reaction mixture. The temperature of the reaction mixture rose to 13° C. in 4.5 minutes, then fell to 4° C. at 17 minutes from the beginning of the reaction. The carbon dioxide consumption ceased after 54 minutes and amounted to about 95 percent of the theoretical consumption. The system was flushed with nitrogen and the temperature was raised to room temperature. The light tan-colored solid sodium propiolate that formed was filtered from the reaction mixture, washed with ethyl ether, and vacuum dried for 2 days. The dried solid weighed 71 grams. Silver nitrate titration for a terminal acetylenic function (—C≡CH) indicated a yield of sodium propiolate of about 73 percent, based upon sodium acetylide. The first order reaction rate constant for the carbonation was 0.16 min.$^{-1}$.

Employing apparatus and procedures similar to those described above, additional runs were made employing N,N-dimethylformamide, N,N-dimethylacetamide, and N-methyl-2-pyrrolidone as promoters. The results of these runs, together with the results of the above example as Run 1, are set forth in tabular form below. An example wherein the carbonation was conducted without an amide promoter is included as Run 6 for purposes of comparison.

| Run No. | 1 | 2 | 3 | 4 | 5 | 6 |
|---|---|---|---|---|---|---|
| Charge: | | | | | | |
| Sodium acetylide, moles | 0.7 | 0.93 | 0.90 | 0.89 | 1.02 | 1.77 |
| Dimethylformamide, moles | 1.4 | 4.09 | | | | |
| Dimethylacetamide, moles | | | 1.80 | 3.54 | | |
| N-methyl-2-pyrrolidone, moles | | | | | 2.04 | |
| Xylene, moles | 4.8 | 4.04 | 5.94 | 4.55 | 6.68 | 3.65 |
| Reaction Conditions: | | | | | | |
| Carbon dioxide pressure, atm | 0.85 | [1] 0.85 | 0.85 | 0.85 | 0.85 | 1.0 |
| Temperature, °C | 5–10 | 5–10 | 0 | —10 | 0 | 25 |
| Time, minutes | 54 | 18 | 332 | 400 | 158 | 3,900 |
| Product: | | | | | | |
| Weight, grams | 71 | 85 | 83 | 82 | 94 | 106 |
| Yield of sodium propiolate, percent | 73 | 50 | 74 | 74 | 71 | 1.3 |
| Reaction rate constant, min.$^{-1}$ | 0.16 | 0.19 | 0.015 | | 0.032 | |

[1] Final $CO_2$ pressure.

Example II

Employing apparatus and procedures similar to those described in Example I, 142 grams of N,N-dimethylformamide were added to a dispersion of 49.5 grams of sodium methylacetylide in 590 milliliters of xylene. The mixture was cooled to —10° C. and carbon dioxide at a pressure of 0.92 atmosphere was introduced to the reaction mixture. Carbon dioxide consumption ceased after about one hour, at which time the temperature of the reaction mixture had risen to 11° C. The resulting reaction mixture was filtered to recover the solid sodium tetrolate that had formed which, after washing with ethyl ether and vacuum drying, weighed 103 grams. The sodium tetrolate was dissolved in aqueous sulfuric acid and the resulting solution was extracted with ethyl ether. Ethyl ether was evaporated from the extract to recover 61.2 grams of tetrolic acid. The first order reaction rate constant for the carbonation was 0.093 min.$^{-1}$ as compared with 0.0082 min.$^{-1}$ for the carbonation of sodium methylacetylide in the absence of an amide promoter.

Example III

A 500-ml. creased flask equipped with a dispersator-type agitator and containing 0.115 grams oleic acid and 130 millimilers xylene was flushed with dry nitrogen. Then 23.0 grams of metallic sodium were quickly added to the reaction mixture. Nitrogen was passed through the reaction mixture at a rate of 2 moles per hour. The sodium was dispersed in the charge over 15 minutes at 105° C., whereupon the nitrogen flow was turned off and acetylene was passed through the flask at a rate of 1.0 moles per hour. The reaction mixture was maintained at 110± 5° C. After 15 minutes, an additional 100 milliliters xylene were added, and the reaction was continued for 3 hours, at which time the acetylene feed was cut off and nitrogen was passed through the flask. The reaction mixture was then cooled to room temperature, and together with 600 milliliters of xylene, was transferred to a 2-liter creased flask equipped with a carbon dioxide inlet. The system was cooled to —10° C. and evacuated to about two millimeters of mercury pressure. The temperature was then raised to 0° C. and carbon dioxide at a pressure of 643 millimeters of mercury was rapidly added to the reaction mixture. The carbon dioxide consumption ceased after about 15 minutes at which time 16 milliliters (0.21 mole) of dimethylformamide was rapidly added. Upon addition of the dimethylformamide the rate of carbon dioxide absorption increased markedly, ceasing after about thirty minutes. The product was isolated as described in Example I to produce 76 g. of dried solid containing 43 percent sodium propiolate by infrared analysis.

What is claimed is:

1. In the process for producing an alkali metal salt of an acetylenic acid by the reaction of an alkali metal acetylide of the formula RC≡CM, wherein M is an alkali metal atom and R is a member selected from the group consisting of a hydrogen atom and an organic hydrocarbon radical of from 1 to 7 carbon atoms selected from the group consisting of an alkyl radical, an alkenyl radical, an aryl radical, an aryl-substituted aryl radical and an alkyl-substituted aryl radical with carbon dioxide in a normally liquid, inert, organic diluent, the improvement of conducting said reaction in the presence of a reaction promoting amount of an amide of the formula:

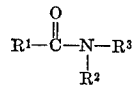

wherein R$^1$, when taken alone, is a member selected from the group consisting of a hydrogen atom and an alkyl radical having from 1 to 4 carbon atoms; each R$^2$ and R$^3$, when taken alone, is an alkyl radical having from 1 to 4 carbon atoms; and R$^1$ and R$^2$, when taken together with the amide radical, form a heterocyclic ring having from 5 to 7 ring atoms, said R$^1$ and R$^2$ forming a divalent alkylene radical having from 3 to 5 carbon atoms.

2. In the process of producing an alkali metal salt of an acetylenic acid by the reaction of an alkali metal acetylide of the formula RC≡CM, wherein M is an alkali metal atom and R is a member selected from the group consisting of a hydrogen atom and an organic hydrocarbon radical of from 1 to 7 carbon atoms selected from the group consisting of an alkyl radical, an alkenyl radical, an aryl radical, an aryl-substituted alkyl radical and an alkyl-substituted aryl radical with carbon dioxide in a normally liquid, inert, organic diluent, the improvement of conducting said reaction at a pressure of less than one atmosphere and a temperature of from —20° C. to + 30° C. in the presence of from 0.2 to 10 moles per mole of said alkali metal acetylide of an amide of the formula:

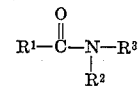

wherein R$^1$, when taken alone, is a member selected from the group consisting of a hydrogen atom and an alkyl radical having from 1 to 4 carbon atoms; each R$^2$ and R$^3$, when taken alone, is an alkyl radical having from 1 to 4 carbon atoms; and R$^1$ and R$^2$, when taken together with the amide radical, form a heterocyclic ring having from 5 to 7 ring atoms, said R$^1$ and R$^2$ forming a divalent alkylene radical having from 3 to 5 carbon atoms.

3. The process as claimed in claim 2, wherein said amide is N,N-dimethylformamide.

4. The process as claimed in claim 2, wherein said amide is N,N-dimethylacetamide.

5. The process as claimed in claim 2, wherein said amide is N-methyl-2-pyrrolidone.

6. In the process for producing sodium propiolate by the reaction of sodium acetylide with carbon dioxide in a normally liquid, inert, organic diluent, the improvement of conducting said reaction in the presence of a reaction promoting amount of an amide of the formula:

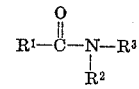

wherein R$^1$, when taken alone, is a member selected from the group consisting of a hydrogen atom and an alkyl radical having from 1 to 4 carbon atoms; each R$^2$ and R$^3$, when taken alone, is an alkyl radical having from 1 to 4 carbon atoms; and R$^1$ and R$^2$, when taken together with the amide radical, form a heterocyclic ring having from 5 to 7 ring atoms, said R$^1$ and R$^2$ forming a divalent alkylene radical having from 3 to 5 carbon atoms.

7. In the process for producing sodium propiolate by the reaction of a sodium acetylide with carbon dioxide in a normally liquid, inert, organic diluent, the improvement of conducting said reaction at a pressure of less than one atmosphere and a temperature of from —20° C. to +30° C. in the presence of from 0.2 to 10 moles per mole of said alkali metal acetylide of an amide of the formula:

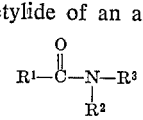

wherein R$^1$, when taken alone, is a member selected from the group consisting of a hydrogen atom and an alkyl radical having from 1 to 4 carbon atoms; each R$^2$ and R$^3$, when taken alone, is an alkyl radical having from 1 to 4 carbon atoms; and R$^1$ and R$^2$, when taken together with the amide radical, form a heterocyclic ring having from 5 to 7 ring atoms, said R$^1$ and R$^2$ forming a divalent alkylene radical having from 3 to 5 carbon atoms.

8. The process as claimed in claim 7, wherein said amide is N,N-dimethylformamide.

9. The process as claimed in claim 7, wherein said amide is N,N-dimethylacetamide.

10. The process as claimed in claim 7, wherein said amide is N-methyl-2-pyrrolidone.

11. In the process for producing sodium tetrolate by the reaction of sodium methylacetylide with carbon dioxide in a normally liquid, inert, organic diluent, the improvement of conducting said reaction in the presence of a reaction promoting amount of an amide of the formula:

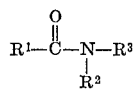

wherein $R^1$, when taken alone, is a member selected from the group consisting of a hydrogen atom and an alkyl radical having from 1 to 4 carbon atoms; each $R^2$ and $R^3$, when taken alone, is an alkyl radical having from 1 to 4 carbon atoms; and $R^1$ and $R^2$, when taken together with the amide radical, form a heterocyclic ring having from 5 to 7 ring atoms, said $R^1$ and $R^2$ forming a divalent alkylene radical having from 3 to 5 carbon atoms.

12. In the process for producing sodium tetrolate by the reaction of sodium methylacetylide with carbon dioxide in a normally liquid, inert, organic diluent, the improvement of conducting said reaction at a pressure of less than one atmosphere and a temperature of from $-20°$ C. to $+30°$ C. in the presence of from 0.2 to 10 moles per mole of said alkali metal actylide of an amide of the formula:

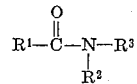

wherein $R^1$, when taken alone, is a member selected from the group consisting of a hydrogen atom and an alkyl radical having from 1 to 4 carbon atoms; each $R^2$ and $R^3$, when taken alone, is an alkyl radical having from 1 to 4 carbon atoms; and $R^1$ and $R^2$, when taken together with the amide radical, form a heterocyclic ring having from 5 to 7 ring atoms, said $R^1$ and $R^2$ forming a divalent alkylene radical having from 3 to 5 carbon atoms.

13. The process as claimed in claim 12, wherein said amide is N,N-dimethylformamide.

14. The process as claimed in claim 12, wherein said amide is N,N-dimethylacetamide.

15. The process as claimed in claim 12, wherein said amide is N-methyl-methyl-2-pyrrolidone.

References Cited by the Examiner

UNITED STATES PATENTS

| | | | |
|---|---|---|---|
| 2,799,703 | 7/1957 | Pachter | 260—533 |
| 3,028,423 | 4/1962 | Blumenthal | 260—618 |

LORRAINE A. WEINBERGER, *Primary Examiner.*

S. B. WILLIAMS, *Assistant Examiner.*